Patented Dec. 12, 1922.

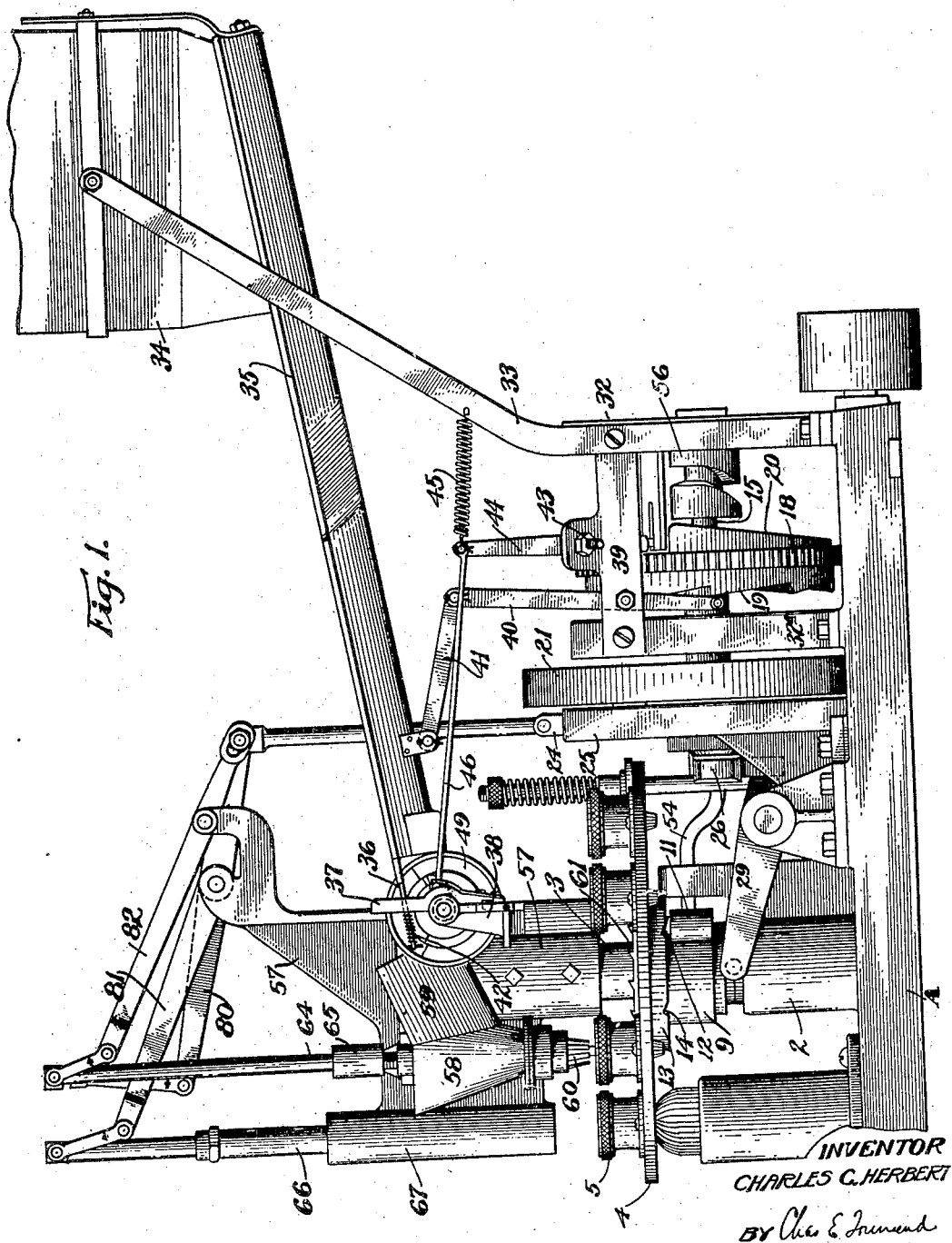

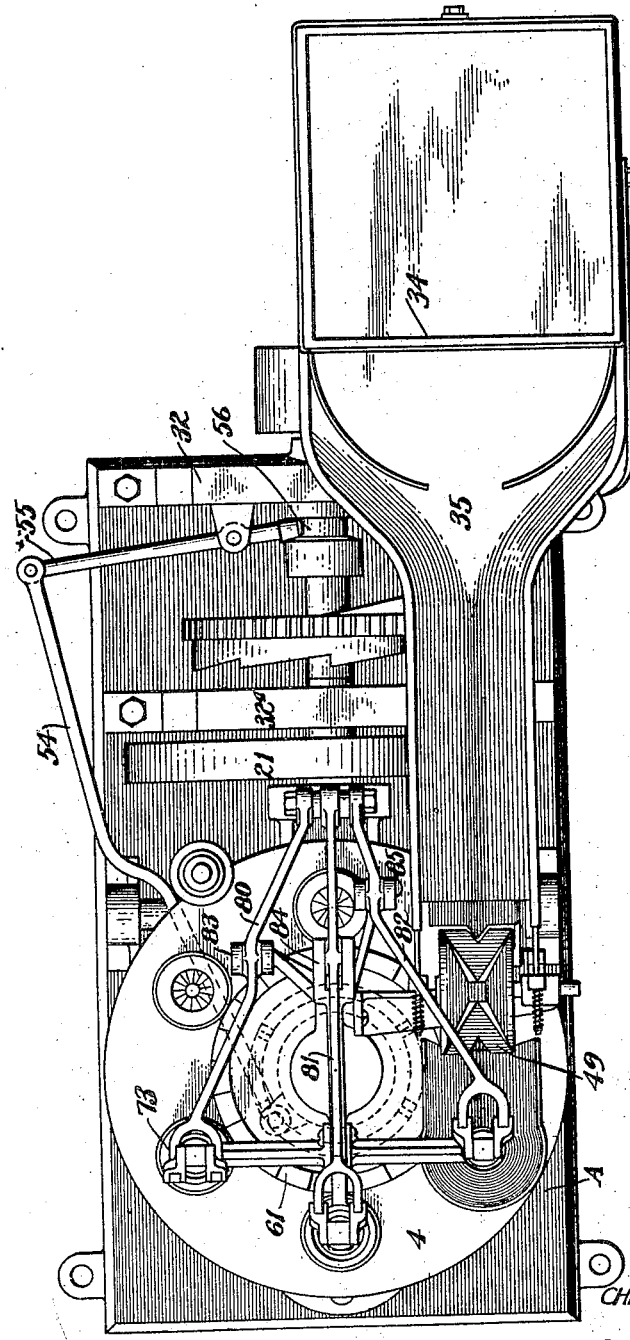

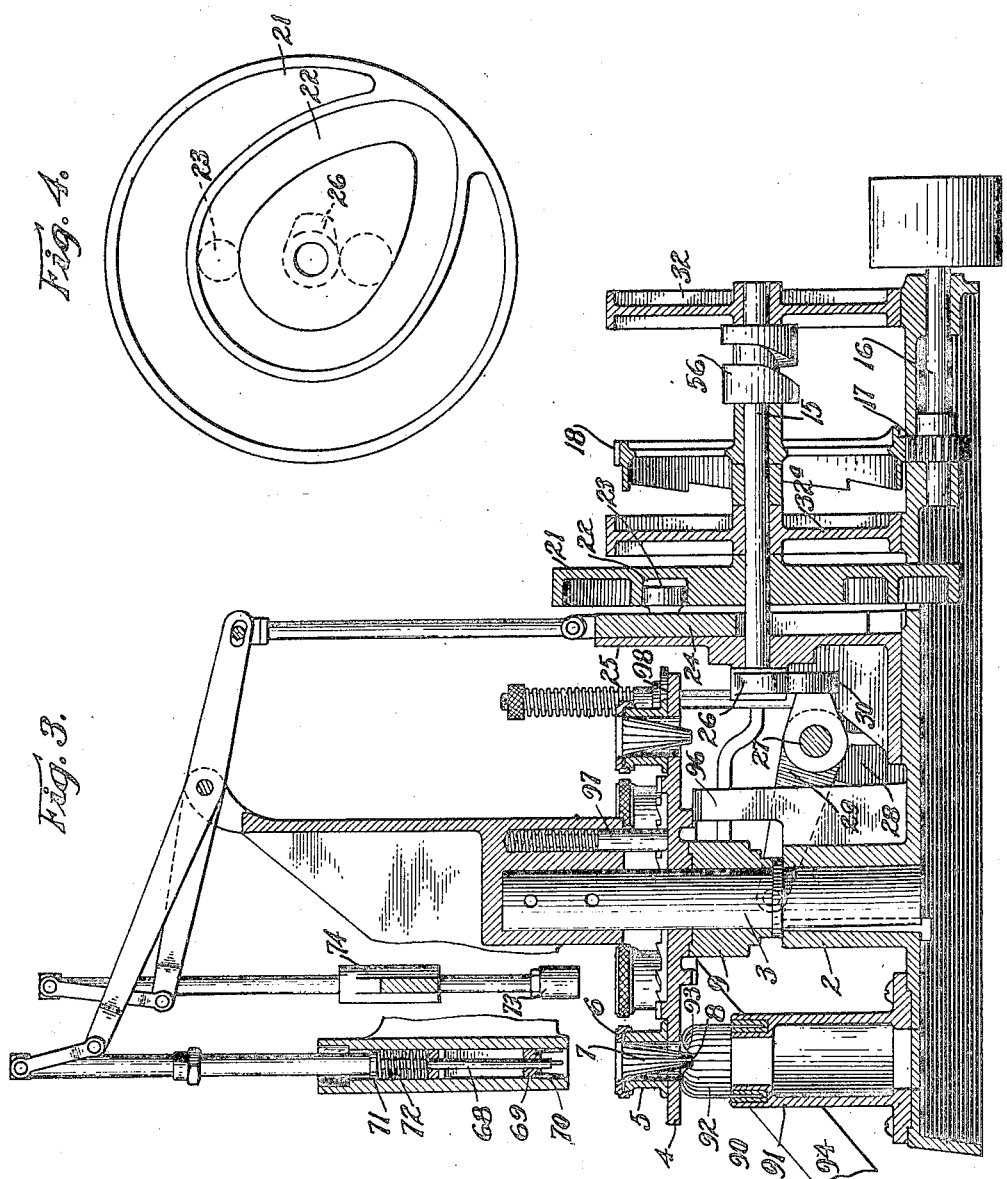

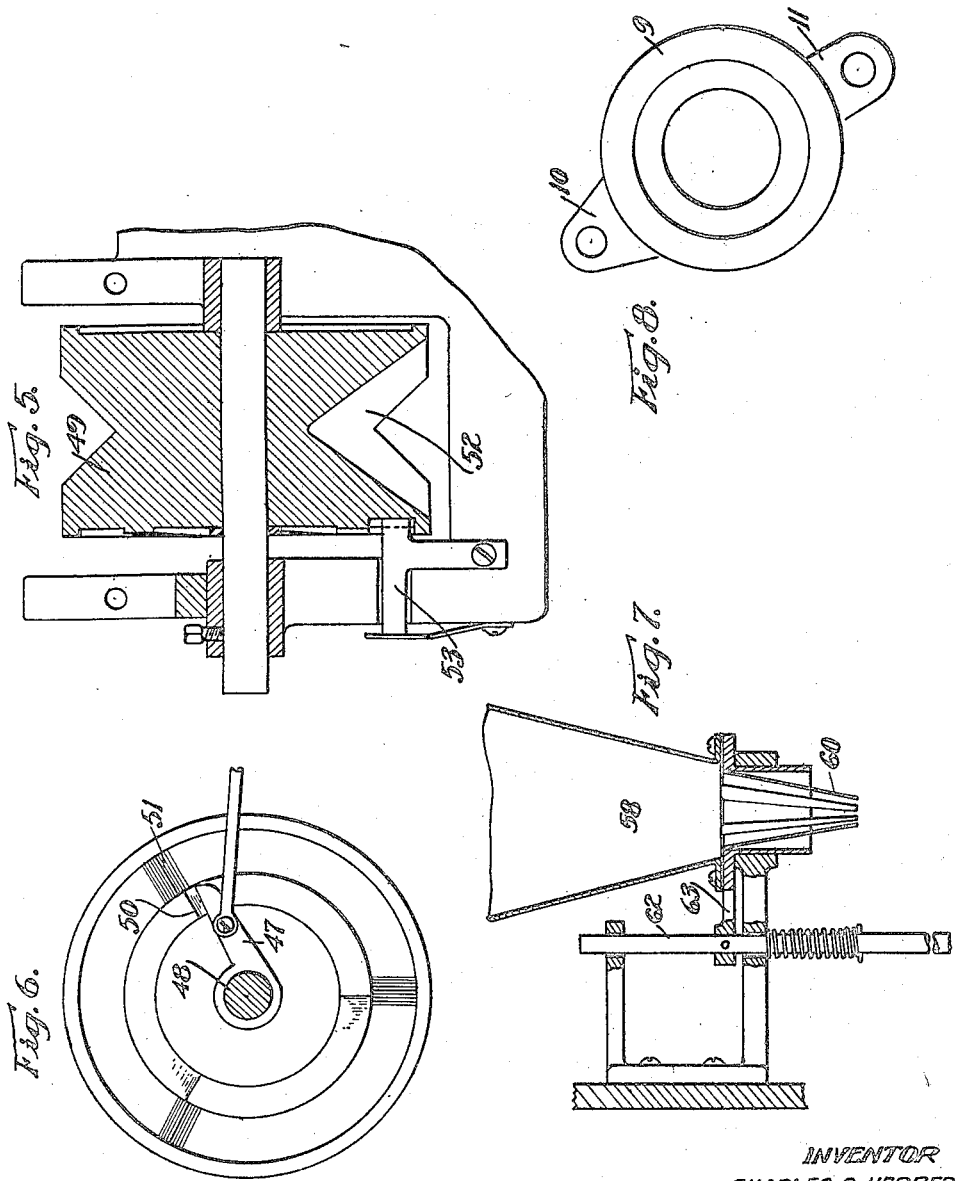

1,438,526

UNITED STATES PATENT OFFICE.

CHARLES C. HERBERT, OF SAN JOSE, CALIFORNIA, ASSIGNOR TO WILLIAM E. WARD, OF SAN JOSE, CALIFORNIA.

FRUIT-PITTING MACHINE.

Application filed July 20, 1921. Serial No. 486,013.

*To all whom it may concern:*

Be it known that I, CHARLES C. HERBERT, a citizen of the United States, residing at San Jose, in the county of Santa Clara and State of California, have invented new and useful Improvements in Fruit-Pitting Machines, of which the following is a specification.

This invention relates to a fruit pitting machine, and especially to a machine for perforating and removing the pits from fruits, such as prunes, plums, apricots, peaches, cherries, olives and the like.

One of the objects of the present invention is to generally improve and simplify machines of this character, and especially to provide a machine which will readily remove the pits without excessively tearing or marring the fruit.

Another object of the invention is to provide means for automatically delivering fruit, such as dried prunes, one by one to the pitting mechanism and for automatically removing the prunes when pitted.

Another object of the invention is to provide a machine which is substantial and compact in construction, of large capacity, rapid in operation and in which every operation is positive so as to prevent clogging either with fruit or pits.

Further objects will hereinafter appear.

The invention consists of the parts and the construction, combination and arrangement of parts as hereinafter more fully described and claimed, having reference to the accompanying drawings, in which—

Fig. 1 is a side elevation of the fruit pitting machine.

Fig. 2 is a plan view of the same.

Fig. 3 is a central vertical longitudinal section of the machine.

Fig. 4 is a side elevation of one of the internal cams employed.

Fig. 5 is a central vertical cross section of the wheel whereby the fruit is transferred from the main delivering chute to a secondary chute.

Fig. 6 is a side elevation of the wheel showing the ratchet feed employed.

Fig. 7 is a detail vertical section of the hopper.

Fig. 8 is a plan view of the feed collar whereby the table is intermittently rotated.

Referring to the drawings in detail, A indicates a base member of suitable construction on which is formed a pedestal 2. Secured on this pedestal is a vertically disposed shaft 3, and turnably mounted thereon is a table 4 in which is supported a plurality of fruit receiving carriers 5; there being six employed in the present instance. The carriers are sleeve or cup shaped as shown in section in Fig. 3, and each is provided with a screw cover 6 which serves as a clamp for a cone shaped holder 7 disposed in each member 5. Each receiver 7 is constructed of spring metal and is slitted from end to end to form a plurality of resilient fingers 8; said fingers receiving and supporting the fruit to be pitted as will hereinafter be described. Interposed between the table and the pedestal 2 is a feed collar 9 on which is formed two radially projecting arms 10 and 11 as indicated in Fig. 8. Supported in the arm 11 is a resilient pawl or plunger 12, and formed on the lower side of the table is an annular flange 13 in which are formed notches 14 with which the plunger 12 is adapted to engage. Journalled in suitable bearing members on one end of the base is a shaft 15 to which power is transmitted from a driving shaft 16 by means of a spur pinion 17 and a spur gear 18. Formed on one face of the spur gear 18 is a ratchet face 19 and formed on the opposite face of the gear 18 is a cam 20. Secured on the forward end of the shaft 15 is a wheel 21, and formed in one face of the wheel is an internal cam groove 22 into which projects a roller 23. This roller is secured to a cross head 24 slidably mounted in a bearing member 25, and a reciprocal movement is thus transmitted to the cross head 24 when the wheel 21 is turned. Secured on the shaft 15 in front of the bearing 25 is a small cam 26, see Figs. 3 and 4, and pivoted as at 27 in a bracket 28 is a rocker arm 29, on the outer end of which is journalled a roller 30 which is engaged by the cam 26. The opposite end of the rocker arm is fork shaped to straddle a reduced portion of the feed collar 9 and the function of the rocker arm 29 is that of imparting a vertical movement to the table 4 as will hereinafter be described. Suitably secured to the rearmost bearing member 32 by rods 33 or the like is a main supply hopper 34. Secured to the bottom of the hopper is a feed chute 35, the forward end of which is supported by a pair of rods 36 extending through bracket arms 37 formed on a journal member 38. Pivotally mounted on a bracket plate 39, secured between the bearings 32 and 32ª, is a lever 40. One end of this lever engages the ratchet face 19, while the opposite end is connected by means of a link 41 with the forward end of the feed chute 35. The lever 40 and the link 41 are provided for the purpose of imparting a slight reciprocal or vibratory movement to the hopper 34 and the feed chute 35 to cause the fruit to travel freely down the inclined chute when the machine is in operation. The link 41 imparts movement to the chute in one direction, while a pair of springs 42 interposed between the ends of the rods 36 and the brackets 37 imparts movement in the opposite direction, due to compression and extension of the springs. Also pivotally mounted on the bracket plate 39, as at 43, is a lever 44. The lower end of this lever is engaged by the cam 20, while the upper end of the lever is connected with a spring 45. The lever is also connected by means of a rod or link 46 with an oscillating pawl 47 secured on a shaft 48 journalled in the bearing members 38. Freely turnable on this shaft is a feeding wheel 49, and formed on one face of said wheel is a series of ratchet teeth 50 and a second series of depressions such as indicated at 51. The pawl 47 is constructed of resilient material, such as spring steel or the like, and will during its oscillating movement impart a rotary movement to the feeding wheel 49 in one direction, but will slide over the ratchet teeth 50 when moving in the opposite direction. There are three pockets such as indicated at 52 formed in the face of the feeding wheel. There are three ratchet teeth 50, and three recesses 51; the teeth 50 being engaged by the pawl 47 and the depressions 51 by a spring actuated pawl 53. The pawl 53 and the depressions which it engages are only provided for the purpose of locking the feeding wheel against reverse movement when the pawl 47 returns. They also serve another function, to-wit, that of disposing each pocket in successive order in front of the lower end of the chute 35 so that fruit may be delivered thereto.

Means has so far been described for imparting a vertical movement to the table for vibrating the feeding chute and hopper 34, and for intermittently rotating the feeding wheel 49. Means are also provided for imparting an intermittent rotary movement to the table 4. This means consists of a link 54, a rocker arm 55 and a cam 56. This cam imparts a rocking movement to the arm 55 and as the link 54 is connected with the feeding collar 14, it is obvious that an intermittent step by step rotary movement will be imparted to the table through the pawl or plunger 12 as this will alternately engage the notches 14 formed in the annular flange 13.

The shaft 3 is, as previously stated, stationary. It forms a support for the bearings 38, and it also forms a support for a bracket 57 by which is supported a hopper 58 and an intermediate chute 59. The chute 59 is disposed directly in front of the feeding wheel and receives the fruit discharged thereby. This fruit is delivered to the hopper 58 and settles to the lower end thereof, being temporarily supported in the lower end thereof however by means of a series of inwardly projecting resilient spring fingers 60. The hopper 58 and the chute 59 are vibrated in unison with the feed chute 35 to prevent clogging of fruit and to cause elongated fruit, such as prunes or the like, to settle with the point downwardly when entering between the fingers 60. This vibratory movement is transmitted to the hopper and chute by a series of ratchet teeth 61 formed on the face of the table and by a rod 62 and a connecting arm 63. (See Fig. 7.)

For the purpose of removing the fruit deposited in the hopper 58, and for transferring it to the respective receivers 5 carried by the table, I provide a plunger such as indicated at 64. This plunger is reciprocally mounted in a bearing 65 formed on the bracket 57. The plunger is centrally disposed with relation to the hopper and when a reciprocal movement is imparted thereto, it is obvious that the plunger passes through the hopper and downwardly between the fingers 60, thus forcing the fruit out between the fingers and transferring it to the receiver disposed below the same. Fruit delivered to the receiver is next acted upon when a receiver aligns with a combination perforating and pitting plunger generally indicated at 66. This plunger is reciprocally mounted on a bearing member 67 supported by the bracket 57. The plunger consists of a center rod 68 and a secondary plunger 69. The lower end of the plunger carries a plurality of resilient fingers 70, and movement is transmitted to the plunger 69 from the center plunger 68 by means of a collar 71 and a spring 72. The fruit is perforated and pitted by the plungers 68 and 69 and the fruit it finally removed with relation to the receiver when alignment is made with a discharging plunger 73 reciprocally mounted in bearings 74, also carried by the bracket 57. It may here be stated that the three plungers described are reciprocated in unison by means of the cross head 24, that is the cross head imparts a rocking movement to three individual rocker arms such as indicated at 80, 81 and 82; the respective arms being pivotally supported by the bracket 57 as at 83, 84 and 85.

In actual operation with the hopper 34 filled or partially filled with fruit, such as prunes, it is obvious that the prunes will work down the inclined chute 35, due to the vibratory movement transmitted thereto. An intermittent rotary movement is transmitted to the feeding wheel 49 through the cam 20, the lever 44 and the rod 46. This intermittent movement causes the prunes to be delivered one by one to the chute 59 and the hopper 58, and as these last named members are also subjected to a vibratory movement, it is obvious that the prunes will settle in a downward direction and will finally lodge end first between the resilient members 60. A step by step intermittent rotary movement is continuously transmitted to the table 4 and one receiver after another will thus align with the hopper 58. Whenever the table comes to arrest and the receiver aligns with the hopper, a reciprocal movement is transmitted to the plunger 64 and the prunes are therefore transferred from the fingers 60 to the receiver where they will be temporarily supported by the resilient fingers 8. The next movement of the table will bring the receiver into alignment with the plungers 68 and 69. A reciprocal movement transmitted to these plungers will first cause both plungers to travel downwardly in unison, that is until the fingers 70 of the plunger 69 engage the top of the prune. Further downward movement of the plunger 69 will then be arrested, while the center plunger 68 will continue to descend and will thus perforate the prune and force the pit out through the opposite end between the resilient fingers 8.

For the purpose of preventing another prune from being forced downwardly between the fingers 8 when the pitting operation is taking place, it is obvious that some means must be provided for preventing excess spreading of the lower ends of the fingers 8. This is accomplished by placing an annular member 90 in alignment with the plungers 68 and 69. This annular member is supported by a cylindrical shaped base 91 and consists of a series of resilient fingers 92, the upper ends of which are bent inwardly as at 93 to engage the lower ends of the fingers 8. The fingers 92 thus offer a certain resistance to the spreading of the lower ends of the fingers 8 when the pit is being forced out of a prune, and in fact the resistance is such that only the prune proper will pass between the lower ends of the fingers 8 and the upper curved ends of the fingers 92. The prune is thus ejected and drops downwardly through the member 91 from where it may be removed in any suitable manner.

When the prune has been pitted, reverse movement is imparted to the plungers 68 and 69 and the table is again advanced another step which brings the receiver into alignment with the plunger 73. Reciprocal movement transmitted to this plunger forces the pitted prune out from between the fingers 8, which are now free to yield and the prune is thus liberated and drops into a chute 94, which will convey the prune to any suitable place desired.

In actual operation I wish it understood that the certain plungers 64, 68, 69 and 73, are all reciprocated in unison, that is when the table comes to arrest, a prune is transferred from the hopper 58 to a receiver. A prune previously deposited in the receiver is at the same time being perforated and pitted and the prune already perforated and pitted is at the same time being discharged by the plunger 73.

By referring to Figs. 1 and 3, it will be seen that the fingers 8 of the respective receivers project a slight distance below the lower face of the table. These fingers would secure the table against turning movement as they enter between the fingers 92 when alignment is made with the plungers 68 and 69, that is the fingers would either become bent or broken when engaging this member or would, as previously stated, secure the table against turning. To obviate this difficulty, the means already described for imparting a vertical movement to the table is employed, that is just previous to the functioning of the cam 56, by which turning movement is transmitted to the table, cam 26 swings into engagement with the roller 30 and imparts a vertical lift through the rocker arm 39 and the collar 9 to the table, thus elevating it a sufficient distance to clear the lower ends of the fingers 8 with relation to the fingers 92. At this precise movement, cam 56 moves into action and a turning movement is transmitted to the collar 9 and by the pawl or plunger 12 carried by the collar, movement is also transmitted to the table as one of the notches 14 is engaged. It can thus be seen that the turning movement only takes place when the table is elevated. The moment that the turning movement has been completed, cam 26 moves out of engagement with the roller 30 and the collar and table are lowered. A stationary detent 96 is then engaged and the table comes to rest in the exact position desired. Downward movement of the table is of course caused by gravity as it is freely slidable on the shaft 30, but a downward movement is also assisted by a spring plunger 97 which engages the face of the table as shown in Fig. 3. A spring actuated shoe engaging the exterior edge of the table is also employed as at 98. This shoe constantly engages the table with sufficient friction to permit it to come to a stop the moment the turning mechanism comes to rest. This is of more or less importance as it permits the machine to operate at a fairly high speed without danger of any of the parts swinging out of alignment.

While the present machine has been described as pitting dried prunes, I wish it understood that it may be employed for any other analogous use, and similarly while certain parts of the mechanism employed are more or less specifically illustrated, I wish it understood that various changes in form and proportion may be resorted to within the scope of the appended claims. Similarly, that the materials and finish of the several parts employed may be such as the experience and judgment of the manufacturer may dictate or varying uses may demand.

Having thus described my invention, what I claim and desire to secure by Letters Patent is—

1. A fruit pitting machine comprising a base member, a table journalled to rotate thereon, a plurality of interspaced fruit receiving carriers on the table, a stationary prune receiving hopper, means for delivering prunes to said hopper one by one, and means for transferring the prunes one by one to the successive receiving carriers.

2. A fruit pitting machine comprising a base member, a table journalled to rotate thereon, a plurality of interspaced fruit receiving carriers on the table, a stationary prune receiving hopper, means for delivering prunes to said hopper one by one, a plunger mounted in alignment with the hopper, means for transmitting an intermittent rotary movement to the table to bring the receiving carriers one by one into alignment with the hopper, and means for imparting a reciprocal movement to the plunger to transfer the prunes one by one from the hopper to the receivers.

3. A fruit pitting machine comprising a base member, a table journalled to rotate thereon, a plurality of interspaced fruit receiving carriers on the table, a stationary prune receiving hopper, means for delivering prunes to said hopper one by one, a plunger mounted in alignment with the hopper, means for transmitting an intermittent rotary movement to the table to bring the receiving carriers one by one into alignment with the hopper, means for imparting a reciprocal movement to the plunger to transfer the prunes one by one from the hopper to the receivers, a plurality of yielding fingers in the lower end of the hopper, and means for transmitting a vibratory movement to the hopper to cause the prunes to lodge endwise between the resilient fingers.

4. In a machine of the character described a main prune receiving hopper, a secondary receiving hopper, a chute communicating with the main hopper, a wheel interposed between the chute and the secondary hopper, said wheel having a plurality of pockets formed therein adapted to receive prunes one by one, means for imparting a vibratory movement to the chute to cause the prunes to advance to the wheel and to cause the prunes to deposit one by one in the pockets formed in the wheel, and means for imparting an intermittent rotary movement to the wheel to transfer the prunes from the chute to the secondary hopper one by one.

5. In a machine of the character described a main prune receiving hopper, a secondary receiving hopper, a chute communicating with the main hopper, a wheel interposed between the chute and the secondary hopper, said wheel having a plurality of pockets formed therein adapted to receive prunes one by one, means for imparting a vibratory movement to the chute to cause the prunes to advance to the wheel and to cause the prunes to deposit one by one in the pockets formed in the wheel, means for imparting an intermittent rotary movement to the wheel to transfer the prunes from the chute to the secondary hopper one by one, a plurality of yielding fingers forming a partial closure for the lower end of the secondary hopper, and means for transmitting a vibratory movement to the hopper to cause the prunes to settle downwardly and to lodge endwise between the fingers.

6. In a machine of the character described a main prune receiving hopper, a secondary receiving hopper, a chute communicating with the main hopper, a wheel interposed between the chute and the secondary hopper, said wheel having a plurality of pockets formed therein adapted to receive prunes one by one, means for imparting a vibratory movement to the chute to cause the prunes to advance to the wheel and to cause the prunes to deposit one by one in the pockets formed in the wheel, means for imparting an intermittent rotary movement to the wheel to transfer the prunes from the chute to the secondary hopper one by one, a plurality of yielding fingers forming a partial closure for the lower end of the secondary hopper, means for transmitting a vibratory movement to the hopper to cause the prunes to settle downwardly and to lodge endwise between the fingers, a plurality of prune receiving carriers adapted to align with the secondary hopper in successive order, means for transferring the prunes from the secondary hopper to the receiving carriers one by one, means for perforating and removing the pits from the prunes while in the receiving carriers, and other means for removing the prunes when perforated and pitted.

7. In a machine of the character described a movable support, a plurality of prune receiving carriers mounted on said support, a plurality of yielding fingers mounted within each support, means for depositing a prune between the fingers in each carrier, a member disposed below the support provided with a plurality of yielding fingers adapted to surround and engage the yielding fingers of each carrier, means for imparting a vertical movement to the movable support, means for advancing the movable member to move a carrier into alignment with the last named yielding fingers to cause the fingers of the carrier to enter between the last named fingers, and means for perforating and forcing the pit of the prune through the first and last named fingers.

8. In a machine of the character described a movable support, a plurality of prune receiving carriers mounted on said support, a plurality of yielding fingers mounted within each support, means for depositing a prune between the fingers in each carrier, a member disposed below the support provided with a plurality of yielding fingers adapted to surround and engage the yielding fingers of each carrier, means for imparting a vertical movement to the movable support, means for advancing the movable member to move a carrier into alignment with the last named yielding fingers to cause the fingers of the carrier to enter between the last named fingers, means for perforating and forcing the pit of the prune through the first and last named fingers, and other means for removing the prune when perforated and pitted.

9. A prune pitting machine comprising a base, a vertical stationary shaft supported thereby, a table turnably mounted on the shaft, a plurality of prune receiving carriers secured to the table and interspaced with relation to each other, a cone shaped member within each receiver consisting of a plurality of yielding fingers, means for depositing a prune endwise between the fingers in each carrier, means for engaging the lower ends of the fingers to prevent excess spreading movement of the lower ends of the fingers, and means for perforating and forcing the pit of the prune between the fingers when the fingers are so arranged.

10. A prune pitting machine comprising a base, a vertical stationary shaft secured thereon, a table turnably mounted on the shaft, a plurality of fruit receiving carriers arranged around the periphery of the table and equally interspaced, a cone shaped member within each carrier consisting of a plurality of yielding fingers, means for depositing a prune endwise between the fingers of each carrier, a stationary member arranged below the table, a plurality of yielding fingers arranged in circular formation and supported by said stationary member, means for imparting a vertical movement to the table, means for imparting a step by step rotary movement to the table to permit the fingers of the carriers to enter the fingers on the stationary member and to be withdrawn with relation thereto, means for perforating and forcing the pit of each prune through the fingers of the carriers when surrounded by the last named fingers, and other means for removing the prunes when perforated and pitted.

11. In a machine of the character described a prune receiving carrier, said carrier consisting of a hollow cylindrical member open at both ends, and a cone-shaped die supported by the upper end of said member, said die consisting of a plurality of spring fingers.

12. In a machine of the character described a prune receiving carrier, said carrier consisting of a vertically disposed cylindrical casing open at both ends, a plurality of converging spring fingers supported by the upper end of the casing, and means for securing said fingers, said fingers presenting a wide mouth and a contracted lower opening.

13. In a machine of the character described the combination with the receiving carriers and the converging resilient fingers supported therein, of means for depositing a prune endwise between said fingers, other means for perforating and forcing the pit endwise through the prune and means engaging the lower ends of the resilient members during the pitting operation to avoid excess spreading of the same.

14. In a machine of the character described the combination with the receiving carriers and the converging resilient fingers supported therein, of means for depositing a prune endwise between said fingers, other means for perforating and forcing the pit endwise through the prune, means engaging the lower ends of the resilient members during the pitting operation to avoid excess spreading of the same, said means comprising a stationary member and a plurality of yielding fingers arranged in circular formation and engageable with the lower ends of the fingers in the carrier.

15. In a machine of the character described a combination perforating and pitting mechanism comprising a bearing member, a central plunger journalled therein, a hollow plunger also journalled therein through which the central plunger extends, a collar on the central plunger, and a spring interposed between the collar and the top of the second plunger.

16. In a machine of the character described a combination perforating and pitting mechanism comprising a bearing member, a central plunger journalled therein, a hollow plunger also journalled therein through which the central plunger extends, a collar on the central plunger, a spring interposed between the collar and the top of the second plunger, means for imparting a reciprocal movement to the central plunger and through the spring to the second plunger, and a plurality of yielding fingers secured on the lower end of the second plunger.

17. In a machine of the character described a prune receiving carrier consisting of a vertically disposed cylindrical open ended casing, a plurality of converging resilient fingers supported in the upper end of the casing terminating in a wide mouth at the upper end and in a small contracted opening at the lower end, means for depositing a prune endwise between said fingers, means for perforating the prune when supported by the fingers and for forcing the pit endwise through the prune between the lower ends of the fingers, and means cooperating therewith and engaging the upper end of the prune during the perforating and pitting operation.

18. In a machine of the character described a prune receiving carrier consisting of a vertically disposed cylindrical open ended casing, a plurality of converging resilient fingers supported in the upper end of the casing terminating in a wide mouth at the upper end and in a small contracted opening at the lower end, means for depositing a prune endwise between said fingers, means for perforating the prune when supported by the fingers and for forcing the pit endwise through the prune between the lower ends of the fingers, means cooperating therewith and engaging the upper end of the prune during the perforating and pitting operation, and other means engaging the lower ends of the resilient fingers to prevent excess spreading thereof when the pit is being removed.

19. In a machine of the character described a prune receiving carrier consisting of a vertically disposed cylindrical open ended casing, a plurality of converging resilient fingers supported in the upper end of the casing terminating in a wide mouth at the upper end and in a small contracted opening at the lower end, means for depositing a prune endwise between said fingers, means for perforating the prune when supported by the fingers and for forcing the pit endwise through the prune between the lower ends of the fingers, means cooperating therewith and engaging the upper end of the prune during the perforating and pitting operation, other means engaging the lower ends of the resilient fingers to prevent excess spreading thereof when the pit is being removed, means for moving the carrier vertically and out of alignment with said last named means and into alignment with the second plunger, and means for imparting a reciprocal movement to said second plunger to force the prune when perforated and pitted out between the lower ends of the resilient fingers.

20. In a machine of the character described a transfer plunger, a perforating and pitting plunger and a discharging plunger, a prune receiving carrier, means for depositing a prune endwise therein, means for moving the carrier successively into register with the several plungers, and means for imparting a reciprocal movement to the several plungers when a carrier registers therewith.

21. In a machine of the character described a main prune delivery chute, a receiving hopper, means interposed between the chute and the hopper for insuring the delivery of prunes one by one to the hopper, a plurality of yielding fingers forming a partial closure for the lower end of the hopper, means for transmitting a vibratory movement to the hopper to cause the prunes to lodge endwise between the fingers, and other means for removing the prunes one by one from between the fingers.

22. A prune pitting machine comprising a base, a vertically disposed stationary shaft supported thereby, a table turnably mounted on the shaft, a continuously rotating shaft, a collar disposed below the table, means actuated by the continuously rotating shaft for imparting a vertical movement to the table, other means actuated by the continuously rotating shaft for imparting a partial turning movement to the table when in lifted position, means for securing the table against rotation when assuming normal position, a plurality of prune receiving carriers supported by the table, a prune receiving hopper disposed above the table under which the carriers move and with which they are adapted to align one by one when the table is stationary, a pitting plunger supported above the table with which the carriers are adapted to align one by one, a discharging plunger above the table with which the carriers are adapted to align one by one, a plunger disposed above the hopper adapted to transfer the prunes one by one from the hopper to the carriers, and means actuated by the continuously revolving shaft for imparting a reciprocal movement to the several plungers in unison so as to simultaneously transfer a prune from the hopper to a carrier and perforate and remove a pit from the prune previously delivered to the carrier, and also simultaneously remove a pitted prune from another carrier.

CHARLES C. HERBERT.